Aug. 18, 1964     C. M. MINKE     3,144,776
LATCH MECHANISM
Original Filed Dec. 20, 1957
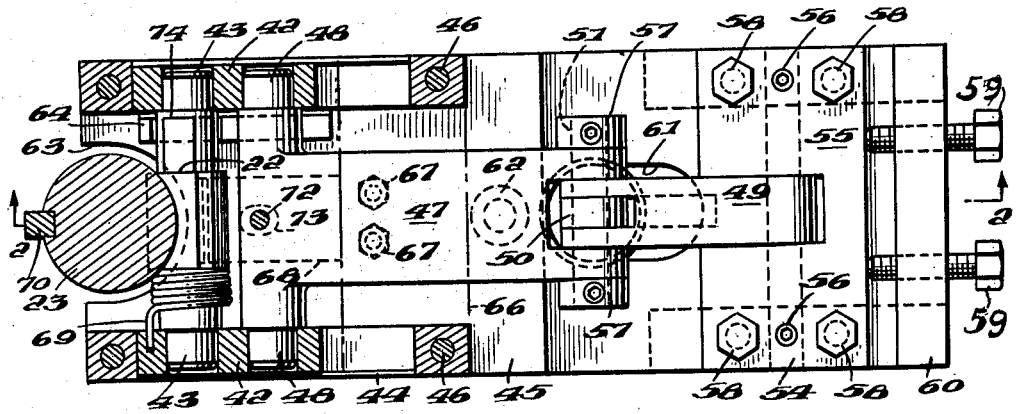
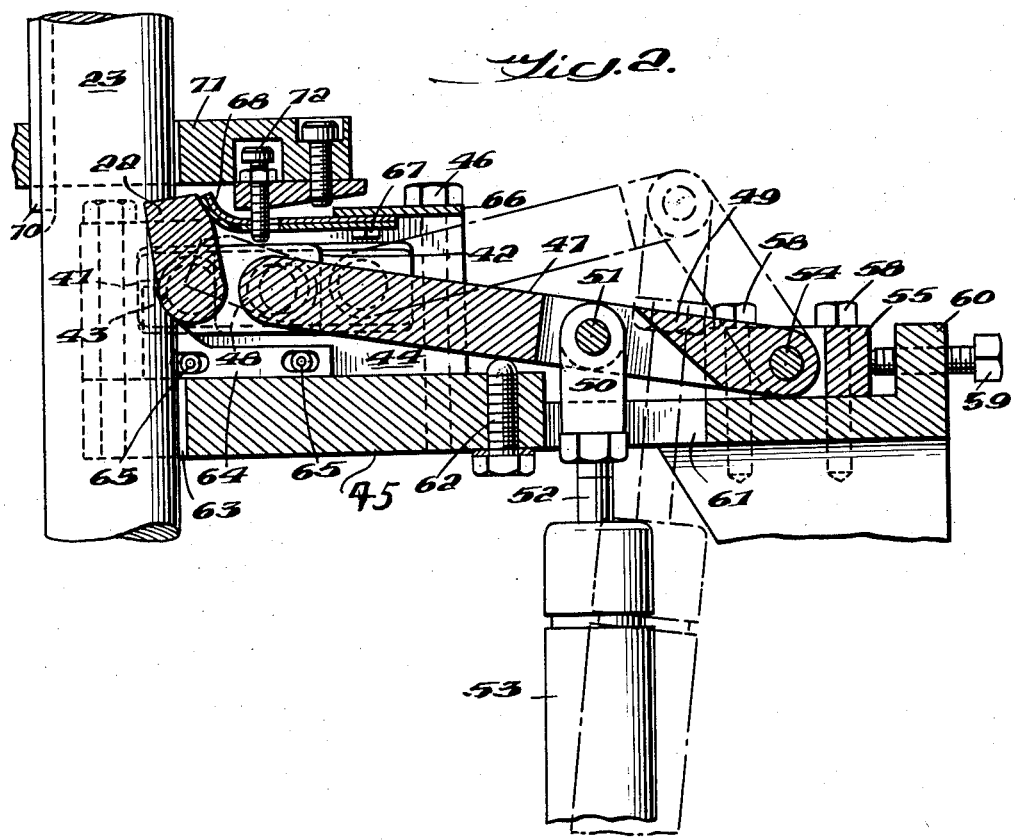

3,144,776
LATCH MECHANISM
Charles M. Minke, Cumberland, Md., assignor to Allegany Instrument Company, Inc., Cumberland, Md., a corporation of Maryland
Original application Dec. 20, 1957, Ser. No. 704,143. Divided and this application July 6, 1962, Ser. No. 208,139
2 Claims. (Cl. 74—2)

This invention relates to an apparatus and method for testing the strength of materials at extremely high deformation rates and more particularly to a latch mechanism therefor.

This application is a division of my copending application Serial No. 704,143, filed December 20, 1957, now Patent No. 3,057,190, issued October 9, 1962.

For some time there has been a need for a tensile and compressive testing machine with higher rate performance than testing machine technology was able to produce, requiring investigators to use low rate and impact techniques. New materials, as well as new designs and manufacturing techniques, now demand truly comprehensive testing, testing at deformation rates comparable to those the product actually encounters in use. This need had led to the development of the present invention, which provides a completely calibrated stress-strain record of the deformation of a specimen at rates of deformation as high as 6000 inches per minute. The apparatus can be operated by non-skilled personnel and its permits thorough low cost investigation of ultimate yields, elastic moduli, temperature effect, etc.

Briefly, according to the invention, a pressure is built up in an accumulator behind a piston which is latched by a specially designed latching mechanism. This piston is attached to the tension or compression jaws which hold the specimen. When the latching mechanism disengages the piston, the force behind the piston will drive the piston very quickly giving a high strain rate to the specimen.

An object of this invention is to provide an improved latch mechanism for the testing apparatus.

A further object of the invention is to provide a new and improved apparatus latch for testing strength of materials.

The objects and advantages can be better understood with reference to the specific description and following drawings.

FIG. 1 is a plan view, partially in section, showing the latch mechanism, and

FIG. 2 is a sectional view taken on the line 2—2 of FIG. 1.

Patent No. 3,057,190, issued October 9, 1962, shows one application of the latch mechanism of this invention to a testing machine.

FIGURES 1 and 2 illustrate the latch mechanism in detail. The latch 22 is shown engaged with the rod 23. FIGURE 1 illustrates a top plan view, parts of which are shown in phantom. FIGURE 2 illustrates a section through FIGURE 1, and in phantom the position of the latch mechanism when it is disengaged. The latch 22 is fixed to a shaft 41 which is mounted between two slides 42 by bearings 43. The bearings 43 permit the shaft 41 to rotate and thus the latch 22 may pivot about the axis of the shaft 41. The slides 42 ride in guides 44 which are fixed to a mounting plate 45 by means of bolts 46. A link 47 is also pivotally mounted at one end between the slides 42 by means of bearings 48. The other end of the link 47 is forked and is pivotally attached to one end of a second link 49 and a clevis 50 by means of a shaft 51. The end of the link 49 which is pivotally mounted on shaft 51 is also forked and both tines of the forked end fit between the tines of the forked end of the link 47. The clevis 50 fits between the tines of the forked end of the link 49 to pivot on the shaft 51. A pair of collars 57 are fixed to each end of the shaft 51 locking the shaft in position through the links 47 and 49 and clevis 50. A shaft 52 passes through an oval aperture 61 in the mounting plate 45 and fixedly attaches the clevis 50 to the piston of an air cylinder 53. The slot between the tines of the forked end of the link 49 is cut back at an angle so that the lower part of the slot extends further into the link than the upper part, the root of the slot being slanted. The purpose of this slanted root is to allow room for the clevis 50 in the disengaged position as is shown in phantom in FIGURE 2. The link 49 is pivoted on a shaft 54 which is mounted in a clevis block 55. The shaft 54 is positioned in the slot of the clevis block, to which it is secured by means of set screws 56. The link 49 pivots on the axis of the shaft 54 within the slot of the clevis block. Bolts 58 fasten the clevis block to the mounting plate and bolts 59 pass through a toe 60 of the mounting plate and butt against the clevis block to firmly fix the horizontal position of the clevis block. The mounting plate 45 is in two thicknesses. The guides 44 are mounted on the thicker portion while the oval aperture 61, the clevis block 55 and the toe 60 are all positioned on the thinner part of the mounting plate. A bumper 62 is mounted in the thicker part of the mounting plate 45. The bumper has a rounded end upon which the link 47 rests when the latching mechanism is in its engaged position as shown in FIGURE 2. The thicker end of the plate 45 is formed with a semi-circular recess 63, the arms of which extend around the rod 23. The slide guides extend out over these arms. Extending partly over one arm of the recess 63 is a cam 64. This cam is firmly fastened to one of the guides 44 by means of screws 65. A dog 74 extends out from the latch 22 over the cam surface of the cam 64 to engage therewith. Fixed to, and extending across the top of the guides 44, is a mounting plate 66. Screws 67 fasten a leaf spring 68 to the underside of this mounting plate between the guides 44. The spring 68 engages the latch 22 and presses it firmly against the rod 23 when the latching mechanism is in the engaged position as shown in the figures. The spring 68 and plate 66 are illustrated in FIGURE 2 and are shown only in phantom in FIGURE 1. A torsion spring 69 encircles the shaft and urges the latch 22 in the opposite direction. The leaf spring 68 exerts a stronger couple on the latch than the torsion spring 69 and holds the latch in the engaged position. The rod 23 has a key 70 which slides in the grooves in a fixed guide plate 71 when the rod 23 moves up or down. Mounted in a recess beneath the guide plate 71 is a butting screw 72, which extends down through an aperture 73 in the middle of the leaf spring 68 to a point between the slides just above the level of the bearings 43 and 48 in the slides 42. This butting screw will engage the latch when it is disengaged, as is shown in phantom in FIGURE 2, preventing the latch from being pressed against the leaf spring by the torque of the torsion spring 69. The guide plate 71 is only shown in FIGURE 2.

When the latch 22 is in its engaged position and the rod 23 presses down against the face of this latch, the links 47 and 49 form a rigid arm. This is done by positioning the shaft 51 on the dead pivot center between the two links so that the line of force transmitted by each of the shafts is collinear. The bumper 62, on which the link 47 rests, maintains this dead center position, and the vertical level of the bumper 62 can be adjusted so that this exact position of the links 47 and 49 can be achieved. To disengage the latch mechanism the air cylinder 53 kicks the clevis 50 upward breaking the rigid arm formed by the links 47 and 49. This operation unlocks the latching mechanism and permits the downward force of the rod 23 on the nearly horizontal face of the latch to force the slides 42 to move in the slide guides 44. As the slides move the latch 22 pivots and moves out of engagement with the rod 23. The release movement of the mechanism is so fast that the inertia of the latch 22 will cause it to pivot counterclockwise against the force of the torsion spring 69 until the dog 74 engages the cam 64. As the disengaging operation is carried out, the air cylinder tilts as illustrated in phantom in FIGURE 2. The disengaged position of the latching mechanism is shown in phantom in FIGURE 2. In this position the torsion spring 69 presses latch 22 against the butting screw 72. After a test is completed, and the rod 23 is returned to the top of its stroke for another test, the latch mechanism is returned to its engaged position by the downward movement of the piston in the air cylinder. This action will cause the slides 42 to move to the left. As the slides 42 move to the left the torsion spring 69, and the leaf spring 68 guide the pivoting movement of the latch 22 and the leaf spring 68 provides final positioning of the latch against the rod 23. The position of the shaft 54 on which the link 49 pivots can be adjusted horizontally by varying the protuberance of the bolts 59 which butt against the clevis block 55, in which the shaft 54 is mounted. Thus, the shaft 54 can be exactly located in the position which produces the optimum operating conditions.

This latch mechanism accomplishes the necessary function of releasing the load swiftly and smoothly so that the stress is applied to the specimen with a minimum amount of oscillation.

The invention as described is a specific embodiment and can be modified within the spirit and scope of the invention which is to be limited only as defined in the appended claims.

What is claimed is:

1. A latch mechanism comprising; a rod, said rod having a groove defined therein, transverse to the axis of said rod, a latch, said latch having one end shaped to fit said groove, a pair of fixed parallel slide guides, a pair of slides riding in said guides, the other end of said latch being pivotally mounted between said slides, said slides being positioned so that said latch will engage said groove when said slides are slid to their engagement position and said latch is pivoted to its engagement position, a leaf spring biased to urge said latch into engagement with said groove when said latch and said slides are in their respective engagement positions, a first link pivotally attached at one end to said slides, a second link pivotally attached at one end to the other end of said first link, said second link being pivotally attached at the other end to a fixed support, the pivot axis of said other end of said second link being positioned so that the axis of force transmission of said first and second links are collinear when said slides are in their engagement position to form a rigid arm of said first and second links, means to move the pivot axis of said other end of said first link and said one end of said second link to break said rigid arm.

2. A latch mechanism comprising: a rod, said rod having a groove defined therein, transverse to the axis of said rod, a latch, said latch having one end shaped to fit in said groove, a pair of fixed parallel slide guides, a pair of slides riding in said guides, the other end of said latch being pivotally mounted between said slides, said guides being positioned so that said latch will engage said groove when said slides are slid to their engagement position, and said latch is pivoted to its engagement position, a leaf spring biased to urge said latch into engagement with said groove when said latch and said slides are in their respective engagement positions, a first link pivotally attached at one end to said slides, a second link pivotally attached to one end to the other end of said first link, said second link being pivotally attached at the other end to a fixed support, the pivot axis of said other end of said second link being positioned so that the axes of force transmission of said first and second links are collinear when said slides are in their engagement position to form a rigid arm of said first and second links, means to move the pivot axis of said other end of said first link and said one end of said second link to break said rigid arm, a fixed cam, a dog mounted on one end of said latch positioned to engage said cam, a coil spring biased to urge said latch so that said dog engages the cam surface on said cam when said slides are out of said engagement positioned, said cam surface being of such a shape as to guide said dog so that said latch is moved into its engagement position as said slides move into their engagement position.

References Cited in the file of this patent

UNITED STATES PATENTS

| | | |
|---|---|---|
| 876,036 | Barnes | Jan. 7, 1908 |
| 1,208,863 | Waldron | Dec. 19, 1916 |
| 2,536,336 | Watson | Jan. 2, 1951 |